United States Patent
Allen et al.

(10) Patent No.: US 6,603,472 B2
(45) Date of Patent: *Aug. 5, 2003

(54) VISUALIZATION SYSTEM INCLUDING DATA NAVIGATOR FOR USE WITH DIGITAL COMPUTER SYSTEM

(75) Inventors: Donald C. Allen, Sudbury, MA (US); Richard Bowker, Hingham, MA (US); Karen C. Jourdenais, Concord, MA (US); Joshua E. Simons, Cambridge, MA (US); Steven J. Sistare, Somerville, MA (US); Richard Title, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/107,627

(22) Filed: Mar. 27, 2002

(65) Prior Publication Data

US 2002/0097239 A1 Jul. 25, 2002

Related U.S. Application Data

(60) Continuation of application No. 09/270,236, filed on Mar. 15, 1999, now Pat. No. 6,366,280, which is a division of application No. 08/003,228, filed on Jan. 11, 1993, now Pat. No. 5,884,016.

(51) Int. Cl.⁷ .............................................. G06T 15/00
(52) U.S. Cl. ......................................... 345/419; 717/109
(58) Field of Search ................................ 345/419, 440, 345/440.2, 784, 804, 973; 707/503; 714/25; 717/4

(56) References Cited

U.S. PATENT DOCUMENTS

| 5,884,016 A | * | 3/1999 | Allen et al. .................. 345/419 |
| 6,366,280 B1 | * | 4/2002 | Allen et al. .................. 345/419 |

* cited by examiner

*Primary Examiner*—Mark Zimmerman
*Assistant Examiner*—Lance W. Sealey
(74) *Attorney, Agent, or Firm*—Meyertons Hood Kivlin Kowert & Goetzel, P.C.; B. Noël Kivlin

(57) ABSTRACT

A data visualization arrangement for facilitating the display of data items comprising a selected region of an object in a selected one of a plurality of display modes. The arrangement comprises a data object store, an interface, an object region retrieval component and a display. The data object store stores the data object, the data object comprising a plurality of data items in a predetermined organization. The interface receives a region identification for identifying a particular region of the object and a display mode identification. The object region retrieval component retrieves data items from a region of the data object as identified by the region identification received by the interface. Finally, the display receives the data items as retrieved by the object region retrieval mechanism and displays them in the display mode as identified by the display mode identification.

7 Claims, 14 Drawing Sheets

COMPUTER SYSTEM 10

VIDEO SCREEN 30

FIG. 3B
FIG. 3C
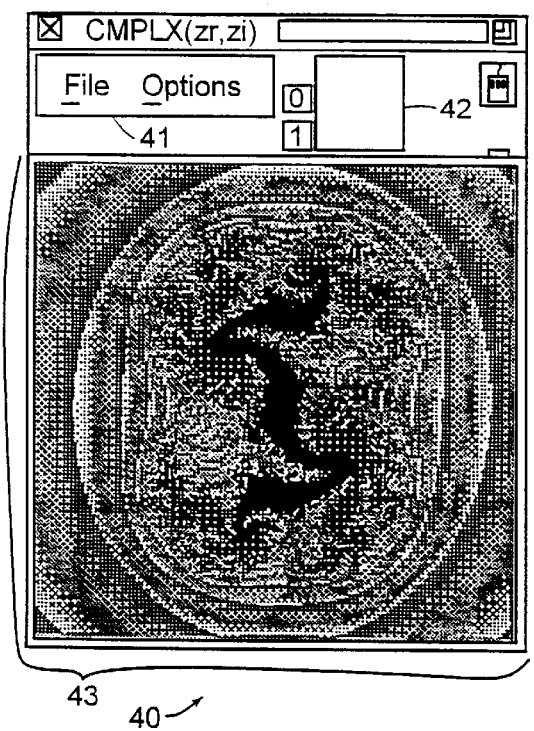
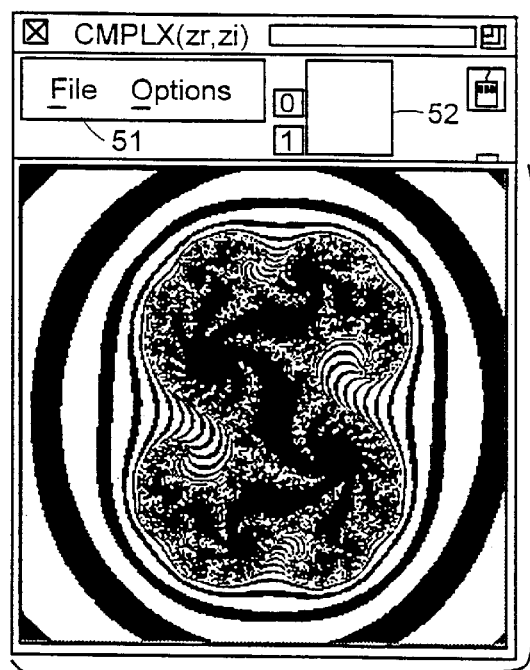
FIG. 3D
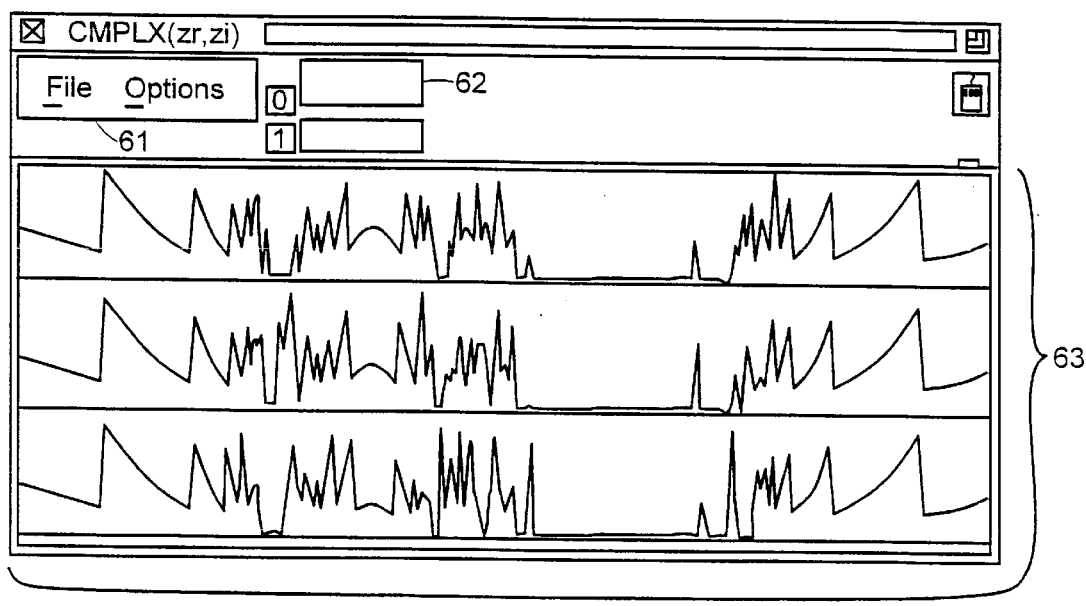

OBJECT

OBJECT STORAGE

ORIGINAL IMAGE

PAN LEFT (LOWER "x" DIRECTION)

PAN DOWN (LOWER "y" DIRECTION)

PAN LEFT & DOWN (LOWER "x" AND "y" DIRECTIONS)

VISUALIZATION SYSTEM INCLUDING DATA NAVIGATOR FOR USE WITH DIGITAL COMPUTER SYSTEM

This application is a continuation of application Ser. No. 09/270,236, filed Mar. 15, 1999, now U.S. Pat. No. 6,366,280, which is a division of application Ser. No. 08/003,228, filed Jan. 11, 1993, now U.S. Pat. No. 5,884,016.

FIELD OF THE INVENTION

The invention relates generally to the field of digital computer systems, and more particularly provides a system and arrangement for facilitating the visualization of data generated by a digital computer system during the processing of a program. The invention is useful in connection with, for example, a debugger program to verify correct operation of another program being debugged with use of the debugger program, as it provides a mechanism for viewing at least a portion of data, either scalar data or data in the form of multi-dimensional arrays, generated during processing of the program being debugged, and also provides a mechanism for easily navigating through the arrays to facilitate viewing of data from diverse regions of the arrays.

BACKGROUND OF THE INVENTION

The work of digital computers is controlled by applications programs, which govern the step-by-step operations performed by the computers in processing data. Verifying that a computer is processing the data in the manner desired by a programmer can be difficult to do, particularly if the program is required to be in any way complex. One way is for the programmer to verify that the logical flow of the program is as he or she intended by the studying the program. While this method may work for some gross errors, it may not be enough to facilitate discovery of all errors, particularly of errors that arise from, for example, errors or eccentricities in the way that the computer itself processes certain program instructions.

Debugger programs have been developed to facilitate debugging of other programs, termed here "applications programs," to ease the programmer's task of discovering and correcting the latter type of errors. Using a debugger program, a programmer can enable the particular computer for which the applications program is being written to process portions of the applications program, using known input data, to thereby enable the generation of output data. Since the input data is known, the programmer can determine what the output data should be, and compare the actual output data to that. If the actual output data corresponds to what the output data should be, the programmer can determine that the applications program is likely to be correct. On the other hand, if the actual output data does not correspond to what the output data should be, the programmer will know that further work is necessary to perfect the program.

In some cases, the amount of data generated by an application program, processed under control of a debugger program, can be quite voluminous. For example, many applications program operate on arrays of data, which arrays can be quite large and have many dimensions. Easy retrieval of portions of such arrays for display and examination using conventional debugger programs can be fairly difficult.

SUMMARY OF THE INVENTION

The invention provides a new and improved arrangement for facilitating the visualization of a selected region of data from a data object, in one of a plurality of predetermined display modes, to facilitate the debugging of a computer program.

In brief summary, the data visualization arrangement facilitates the display of data items comprising a selected region of an object in a selected one of a plurality of display modes. The arrangement comprises a data object store, an interface, an object region retrieval component and to a display. The data object store stores the data object, the data object comprising a plurality of data items in a predetermined organization. The interface receives a region identification for identifying a particular region of the object and a display mode identification. The object region retrieval component retrieves data items from a region of the data object as identified by the region identification received by the interface. Finally, the display receives the data items as retrieved by the object region retrieval mechanism and displays them in the display mode as identified by the display mode identification.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A through 3E are diagrams illustrating various display modes with which the computer system, controlled by the debugger program, displays selected regions of an object;

DETAILED DESCRIPTION OF AN ILLUSTRATIVE EMBODIMENT

Figure 1:
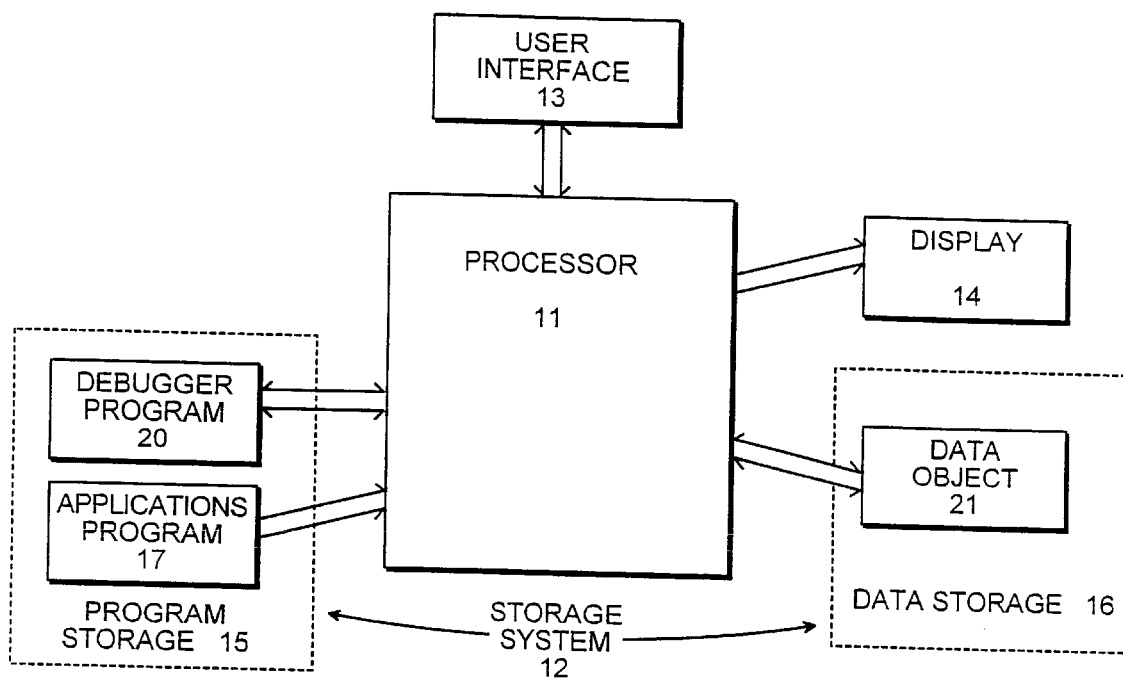
FIG. 1 is a general functional block diagram showing the new debugger program in the environment of a computer system.

FIG. 1 is a general functional block diagram showing the new debugger program in the environment of a computer system 10. As is conventional, the computer system 10 includes a processor 11, a storage system 12, a user interface 13 for receiving input from a user via, for example, a keyboard and a pointing device such as a mouse (not shown), and an output device such as video display 14 for displaying output data to the user. The storage system 12 will include a plurality of storage locations which may be divided into a program storage 15 for storing programs for execution and a data storage 16 for storing data. In response to commands received from a user through the user interface 13, the processor 11 executes programs in the program storage 15 to process data (hereinafter "input data") stored in the data storage 16, and generate processed data also for storage in the data storage 16. The processor 11, in response to commands from the user or in response to processing of a program, may also enable data in the data storage 16, including the unprocessed data as well as the processed data, to be displayed by the display 14. As is conventional, the processor 11 may comprise a single processor or a number of processors either executing a plurality of programs or cooperatively executing a single program. Furthermore, the computer system 10 may, in addition to the display 14, include a plurality of diverse types of other output devices (not shown), such as printers and connections to one or more networks, and may also include a number of diverse types of video display devices.

As is particularly pertinent to this invention, the computer system 10 makes use of two diverse types of programs, including applications programs, one of which, namely, applications program 17, is shown in FIG. 1, and a debugger program 20. Generally, applications programs enable the computer system 10 to perform, for example, processing of scientific data or accounting data, text processing, and database operations, among a number of other diverse tasks. A debugger program 20 generally enables a programmer, among other things, to test an applications program that he or she is developing, to determine whether the computer system 10 is processing it in the manner intended to produce proper output data. By using the debugger program, the programmer can enable the processor 11 to execute portions of an applications program portion by portion, and at the end of each portion or sequence of portions examine the output data generated while processing of preceding portions. The programmer can enable the processor 11 to use predetermined input data in this operation, and compare the output data, identified in FIG. 1 as object 21, to expected output data which would be expected if the applications program was executed by the processor 11 in the required manner.

In accordance with the invention, the debugger program 20 enables the processor 11 to display selected regions of the object 21 to the user on display 14.

The operation of the computer system 10 in connection with the applications program 17 and debugger program 20 will be generally described in connection with FIGS. 1 and 2. With reference to those Figs, the processor 11 initially executes the applications program 17 under the debugger program 20 to generate output data in the form of one or more objects, one of which, namely, object 21, is shown in FIG. 1 (step 100). The user can, through the user interface 13, identify particular regions of the object 21 to be displayed through commands issued through the user interface 13 (step 101) and can also identify one of a plurality of display modes to display the data contained in the identified region (step 102). The processor 11 will, under control of the debugger program 20, retrieve the elements from the selected region of the object 21, as will be described below in detail in connection with FIGS. 5A through 5E, and will display the retrieved object elements in the display mode selected by the user (step 103). The processor 11 will monitor commands input by the user to determine whether either the selected region or the display mode has changed (step 104). If the processor 11 determines that the user is issuing a command to change the selected region, it will perform a further retrieval operation in connection with the new region. Similarly, if the processor 11 determines that the user is issuing a command to change the display mode, it will revise the manner in which the display 14 is displaying the previously-retrieved object elements.

Before proceeding to a detailed description of the procedure by which the processor 11, under control of the debugger program 20, retrieves object elements from an identified region of the object 21, it would be helpful to describe generally some of the various display modes provided by one embodiment of the debugger program 20, and also to describe the structure of an object 21 and how its various elements are stored in the storage system 12. With respect initially to the display modes, it should be noted initially an object 21 may take one of a plurality of forms, and the display modes used with a particular object 21 will depend on the form of that object. For example, if the object is a scalar object, it will have a single item of data (termed herein an "object element") which can be displayed in a form which is reasonably intended to indicate the value of the object element; this can be accomplished merely by, for example, displaying the numerical value of the object element. If the object 21 has multiple object elements organized, for example, in a multi-dimensional array, the object elements of the identified region can also be displayed by way of displaying the numerical values of the identified region. Objects in the form of arrays can also be displayed in a number of graphical display modes selected by the user, which may be particularly helpful if the data in the object represents an image. One embodiment of the debugger program 20 permits a user to select among several conventional graphical display modes. The various display modes will be described in connection with FIGS. 3A through 3E.

Figure 3A:
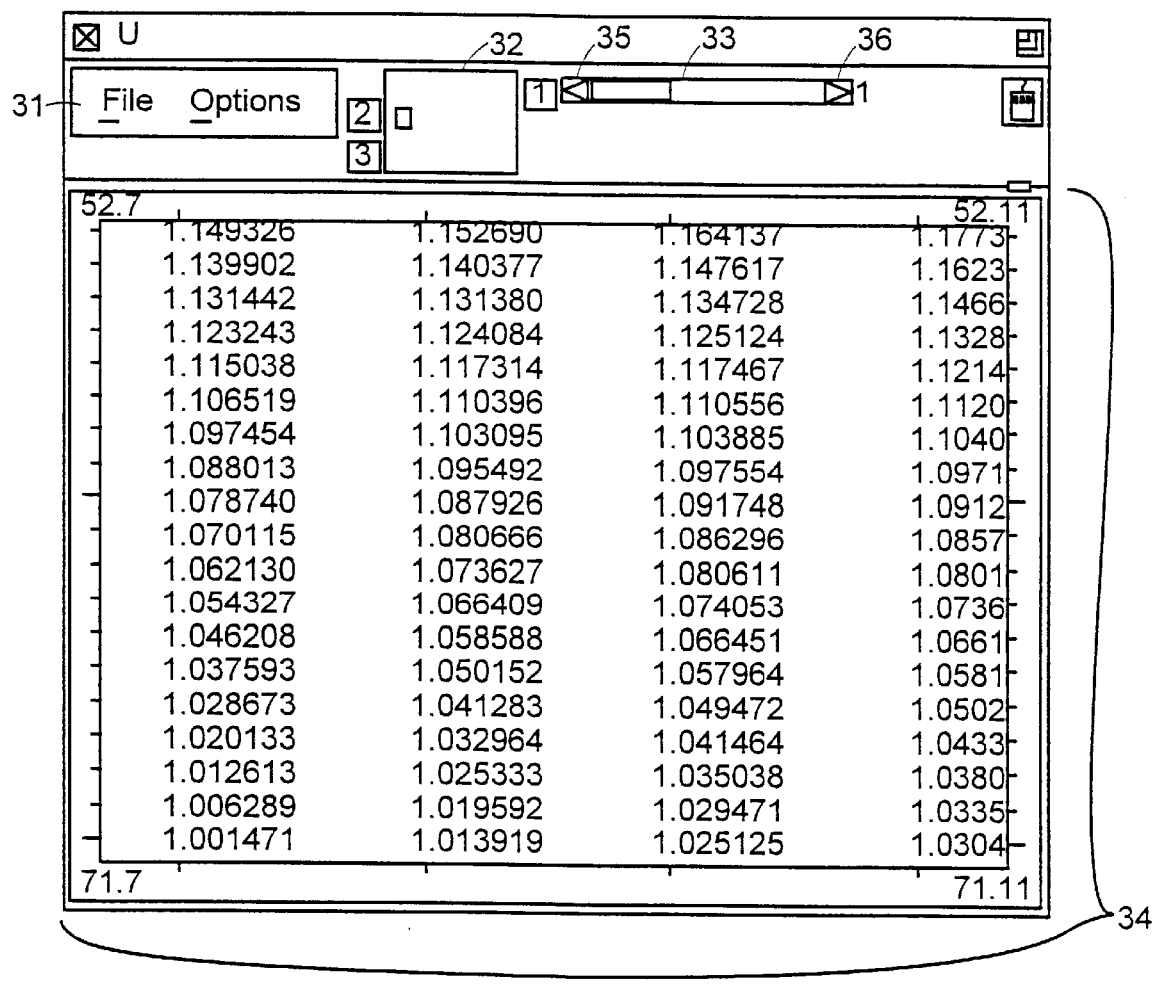

FIG. 3A depicts the appearance of a video screen 30, which the processor 11, under control of one embodiment of the debugger program 20, enables the display 14 to display. The video screen 30 is generally conventionally organized, including, at the top, a menu bar 31 and one or more sliders 32 and 33. At the bottom of screen 30 is a window 34 in which data can be displayed. The menu bar 31 provides a number of menu options, and in the case of the debugger program can be used, in conjunction with a pointing device such as a mouse (not shown), to select the display mode.

Figure 4A:
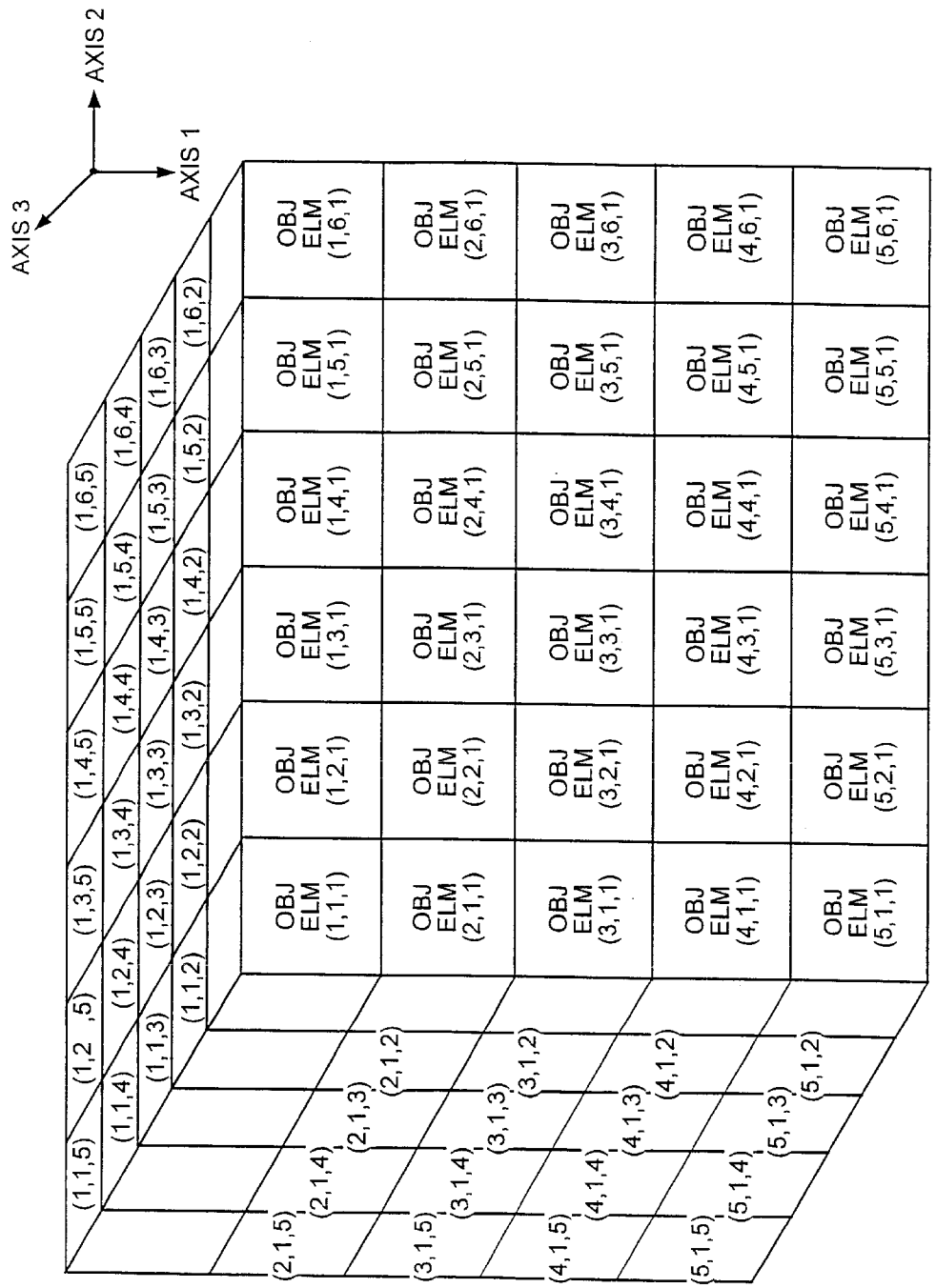
FIG. 4A is a diagram showing the structure of an illustrative object generated by the applications program under control of the debugger program.

The sliders 32 and 33 in FIG. 3A can be used by the user to identify the particular regions of the object 21 (FIG. 1) whose data is to be displayed. The large square slider 32, in conjunction with the numbers "2" and "3" in boxes situated to the left of the slider 32, and the slider 33 with the number "1" in the box situated to the left of slider 33, indicates that the object 21 whose data is to be used in the display is an object comprising an array whose elements are organized in three dimensions, that is, an object, such as an array in which each element of data is identified by a coordinate value along three axes. Such an object is illustrated in FIG. 4A. With reference to FIG. 4A, the three-dimensional object depicted therein comprises an array having a plurality of object elements represented by boxes labeled OBJ ELM (i, j, k) (where indices "i","j," and "k" are integers). Each object element represents a point in the array at the location identified by the indices. FIG. 4A also shows a grid showing the orientations of the axes of the object, which are identified as AXIS 1, AXIS 2 and AXIS 3. For a particular object element OBJ ELM (i, j, k), the value of index "i" identifies its position along AXIS 1, the value of index "j" for the object element identifies its position along AXIS 2, and the value of index "k" identifies its position along AXIS 3.

The collection of object elements OBJ ELM (i, j, k) for a constant value of an index "i,""j" or "k" will be termed herein a "plane". That is, for example, the collection of object elements OBJ ELM (i,j,0) (index "k" equals zero), that is, the collection of object elements along the upper surface of the object shown in FIG. 4A, will be termed a "plane" in the object. Similarly, the collection of object elements OBJ ELM (i,0,k) (index "j" equals zero), namely, the collection of object elements along the left surface of the object shown in FIG. 4A, is termed a plane. Further, the collection of object elements OBJ ELM (0,j,k) (index "i" equals zero), which constitutes the collection of object elements along the front face of the object shown in FIG. 4A, is termed a plane. Similarly with other values of indices "i,""j " and "k." Planes comprising object elements with constant values of index "i" will be termed "horizontal planes", planes comprising object elements with constant values of index "j" will be termed "vertical, rearwardly-directed planes", and planes comprising object elements with constant values of index "k " will be termed "vertically, side-directed planes."

It will be appreciated that an object element may have a number of object elements which differs from that shown in FIG. 4A, and that it may have more or fewer dimensions than is shown in FIG. 4A, and each dimension will be associated with an axis. Further, the number of elements along each axis, and thus the ranges of values for the index for each axis, may differ from that shown in FIG. 4A, as may the low and high ends of the ranges of values for each index.

Returning to FIG. 3A, the display mode with which data from the object 21 is shown in the video screen 30 depicted in that Fig. comprises the numerical display mode. In that display mode, the processor 11 enables the display 14 to display in video screen 30 the numerical values of the portion of the object 21 selected as indicated by the sliders 32 and 33. The large square slider 32 indicates that the data to be depicted in the window 34 is from a plane of the object 21 along indices 2 and 3, and the elongated slider 33 identifies the particular plane along the axis represented by that slider. In particular with respect to slider 33, the portion of the slider between the left-directed and right-directed arrows 35 and 36 represents the extent of the planes of the object 21 along the axis represented with slider 33. In one embodiment, data from only a single plane will be shown in the data window 34, and so the fraction of slider 33 between arrows 35 and 36 which is white (the portion proximate the arrow 35 as shown in FIG. 3A) can provide a visual indication of the number of planes of the object along the axis associated with the slider 33.

Similarly, the length and width extents of the black portion of slider 32 as shown in FIG. 3A represents the entire length and width of the plane, identified by slider 33, which includes the selected region (step 102, FIG. 2), and the white box contained therein represents the extent of the selected region in that plane. The position and extent of the white box in the slider 32 represents the position and extent of the selected region in the plane represented by the slider. The numerical values shown in window 34 represents the numerical values of the object elements in the region identified by the sliders 32 and 33.

It will be appreciated that the menu bar 31 and sliders 32 and 33 are typical display devices which are provided by a conventional windowing display system. By use of such a windowing system, processor 11 will enable the user to, through the user interface 13, modify either or both the position and size of the white portion of the slider 32 and, separately, to modify the position of the white portion of slider 33 to thereby identify another region or to enlarge the region whose object elements are displayed, and in that case the debugger program 20 will enable the processor 11 to retrieve the object elements in that region for display (step 104, FIG. 2).

It will be further appreciated that, if the object 21 has object elements organized in more than three dimensions, such that the object elements will be identified by indices with for more than three axes, the video screen 30 will include corresponding additional sliders similar to slider 33 to identify the index along those dimensions for the plane containing the selected region. Alternatively, if the object has object elements organized in two dimensions, the video screen 30 need only include slider 32, and if the object has object elements organized in one dimension, that is, a linear array, the video screen 30 need only include a slider similar to slider 33 to identify the selected region along the corresponding axis.

Figure 3E:
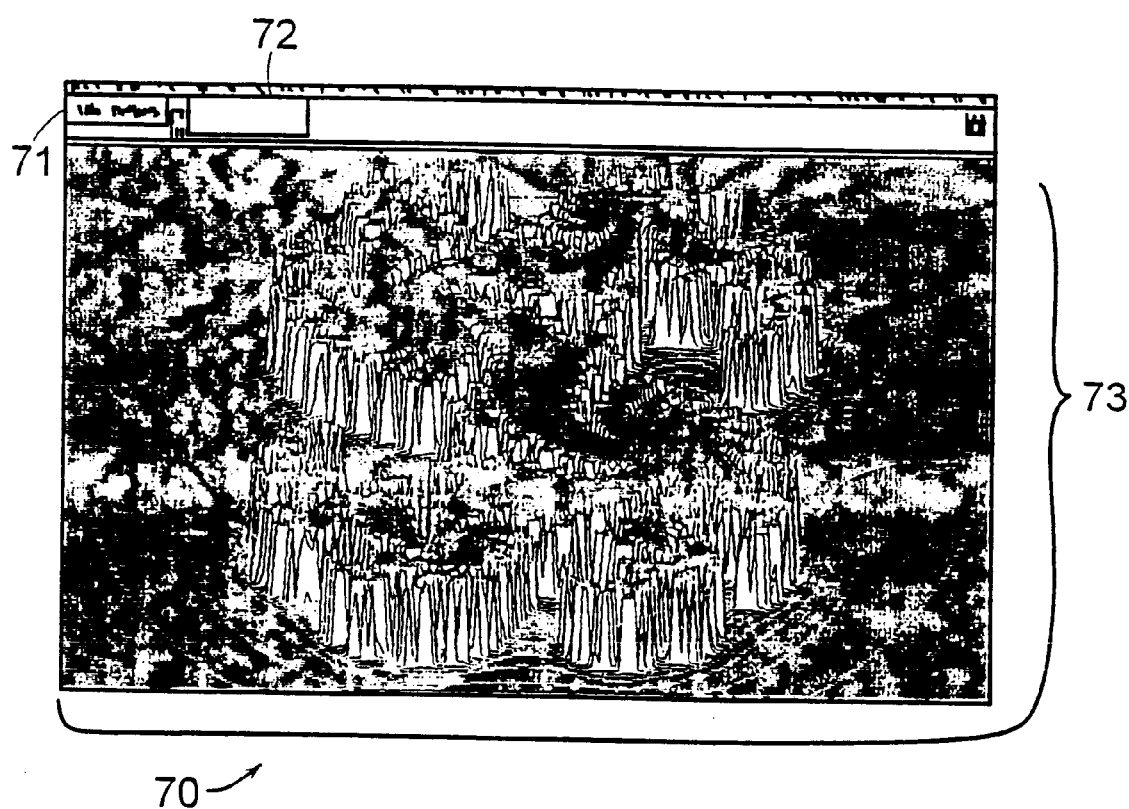

FIGS. 3B through 3E depict screens 40, 50, 60 and 70, respectively, showing for various data from a selected region in various graphical display modes. The object represents values from the complex basis of a julia set, which is a known construct. Each screen 40, 50, 60 and 70, includes a menu bar 41, 51, 61 and 71, respectively, which is similar to menu bar 31 of screen 30 (FIG. 3A). Similarly, each screen 40, 50, 60 and 70 includes a slider 42, 52, 62, and 72, respectively, which is similar to slider 32 of screen 30. Each screen 40, 50, 60 and 70 only includes the one slider, which has a large square shape indicating that the object elements of the object represented thereby is two-dimensional. Each screen 40, 50, 60 and 70 also includes a window 43, 53, 63 and 73, in which the data from the selected region is displayed in the selected graphical display mode. As shown in FIGS. 3B, 3C and 3E, the respective sliders 42, 52 and 72 are essentially completely white, indicating that the selected region comprises the entire object. As shown in FIG. 3D, a line across the slider 62 is white, indicating that the selected region comprises one or more complete rows of the object As noted above, FIGS. 3B through 3E represent the elements of the selected region of object 21 in graphical form. In FIGS. 3B and 3C, the processor 11 uses the values of the respective object elements to determine pixel brightness values for pixels of the windows 43 and 53 having positions corresponding to the indices of the object elements in the object For window 53 (FIG. 3C), the processor 11 uses a threshold rendering technique. In that technique, for each object element of the object 21, the processor 11 determines whether the value of each object element is above or below a predetermined threshold value and enables display 14 to brighten or darken the correspondingly-positioned pixel of window 53 in response. That is, if the processor 11 determines that the value of an object element is above the predetermined threshold value, it enables the display 14 to brighten the correspondingly-positioned pixel, but it will enable the display 14 to darken the pixel if it determines that the value of the object element is below the predetermined threshold value. The window 53 depicts an image having light and dark regions corresponding to one julia set for one threshold value; it will be appreciated that the particular light and dark regions may conversely expand and contract as the threshold value is changed. Window 43 (FIG. 3B) depicts an image generally similar to that shown in window 53 (FIG. 3C), with the exception that the processor uses a dither rendering technique. Window 63 (FIG. 3D) depicts several rows of the object 21, the rows being identified by the slider 62, with the values of the elements in each row being depicted in graphical form. Finally, window 73 (FIG. 3E) depicts the object 21 rendered as a three-dimensional surface, with the value of each object element being used to identify the surface elevation at the point associated with the position of the object element in the object 21. The surface is shown by display 14 at a predetermined angle, which is forty-five degrees in the window 63.

Figure 2:
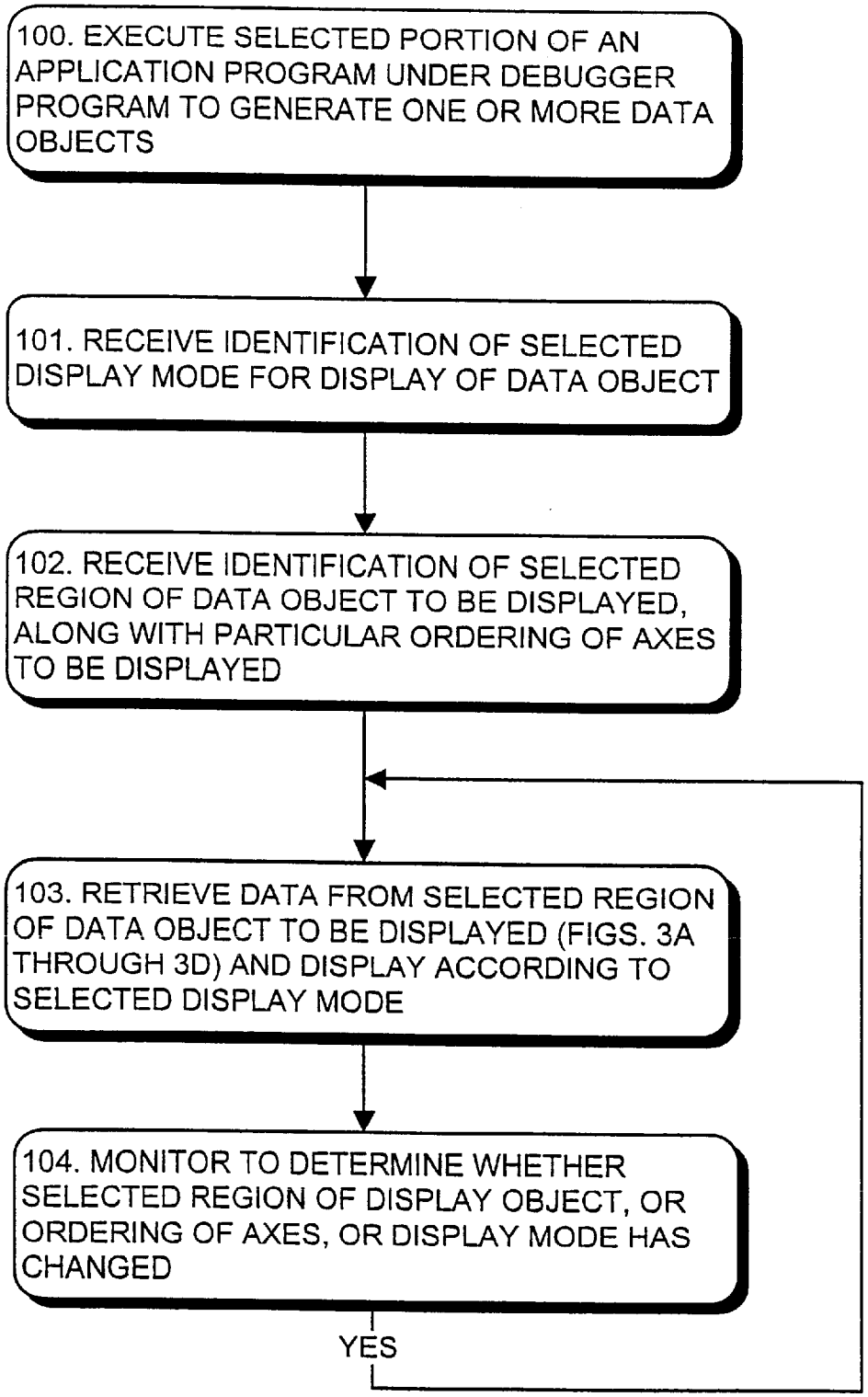
FIG. 2 is a flow diagram generally describing the operations of the debugger program in relation to an applications program in the computer system depicted in FIG. 1.
Figure 4B:
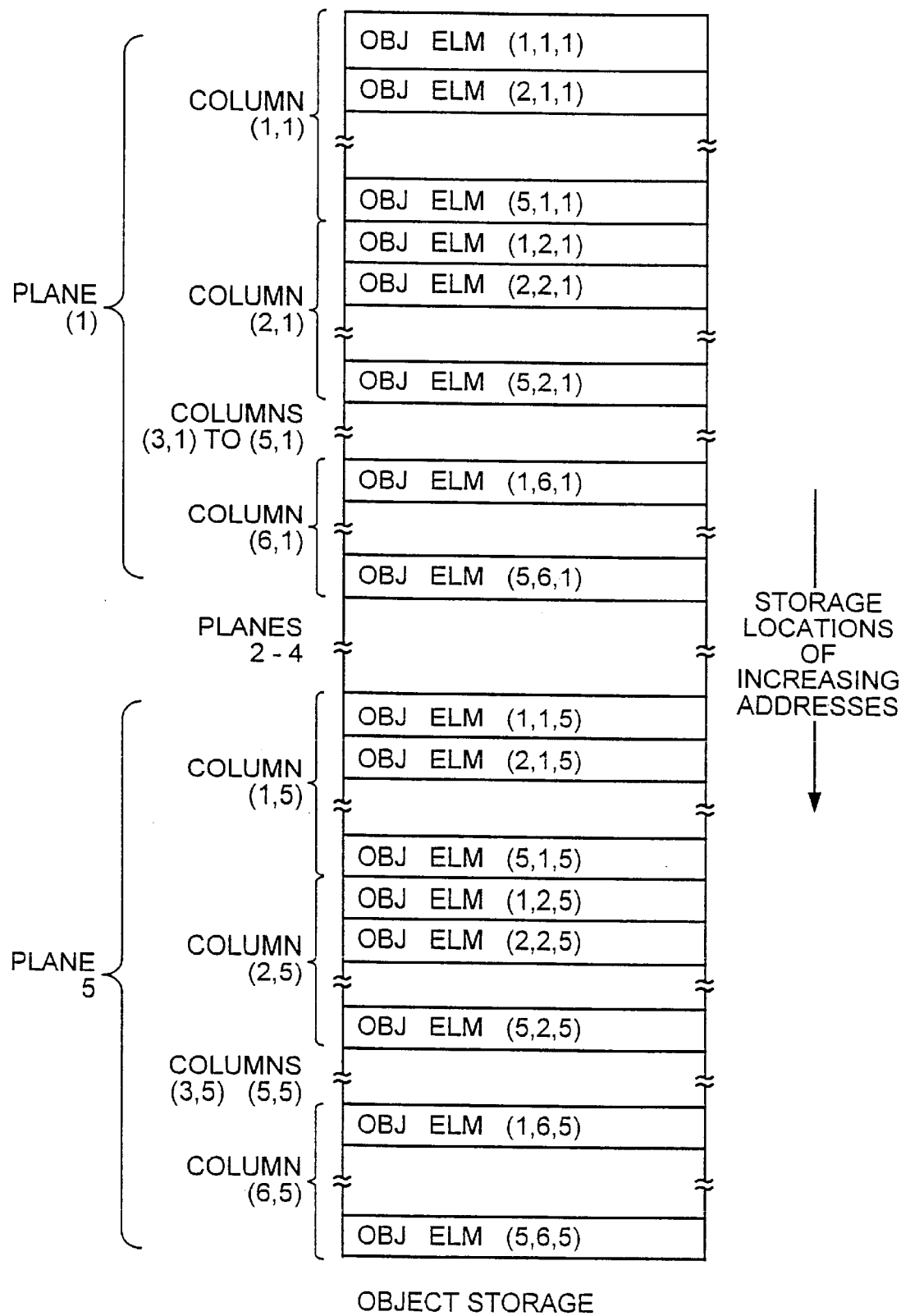
FIG. 4B is a diagram illustrating the storage of the illustrative object in the storage system of the computer system.

As noted above, FIGS. 5A through 5E depict a flowchart describing the operations performed by processor 11 in retrieving from storage 12 object elements in a selected region of the object 21 (step 102, FIG. 2). The issue will be described in connection with FIGS. 4A and 4B. As described above, FIG. 4A depicts the organization of object elements OBJ ELM (i, j, k) of object 21. FIG. 4B, on the other hand, depicts the manner in which the object elements are stored in sequentially-addressed storage locations of the storage system 12. With reference to FIG. 4B, each object element OBJ ELM (i, j, k) is stored in a separate storage location, with the object elements being stored in a predetermined order according to the values of their respective indices "i,""j" and "k", and so a selected region, which identifies contiguous elements in the representation shown in FIG. 4A, may actually identify object elements stored in widely storage locations having widely-separated addresses as shown in FIG. 4B. The processor 11 performs the operations described below in connection with FIGS. 5A through 5E to identify the ones of the sequentially-addressed storage locations which contain the required object elements.

More particularly, the storage system 12 stores the object elements OBJ ELM (i, j, k) in a series of planes identified as PLANE (0) through PLANE (4), each plane containing the object elements from a vertical, side directed plane. That is, each plane PLANE (0) through PLANE (4) in the storage system 12 comprises storage locations which store the object elements OBJ ELM (i, j, k) having a constant value for index "k". Thus, Plane (1) comprises the storage locations for storing object elements OBJ ELM (i,j,1) (index "k"equals one), Plane (2) comprises the storage locations for storing object elements OBJ ELM (i,j,2) (index "k" equals two) and so forth. Each plane PLANE ($k_x$) (for index k=$k_x$) on the other hand, comprises storage locations for storing object elements OBJ ELM (i, j, k) in a series of columns COLUMN (j,$k_x$), with each column including storage locations for object elements OBJ ELM (i,j,$k_x$) having the same indices "j" as the column and "$k_x$" as the plane. Thus, for plane PLANE (1), column COLUMN (1,1) will include storage locations for object elements OBJ ELM (i,1,1), column COLUMN (2,1) will include storage locations for object elements (i,2,1) and so forth. Finally, within each column COLUMN ($j_y$,$k_x$) (for indices j=$j_y$ and k=$k_x$) is a series of storage locations for storing the series of object elements OBJ ELM (i,$j_y$,$k_x$) having the same values for indices "$j_y$" and "$k_x$" with object elements OBJ ELM (i,$j_y$,$k_x$) with increasing values of index "i" being stored in storage locations of increasing address value. Similarly with objects of higher or lower numbers of dimensions and associated axes.

The object element retrieval issue arises in that the debugger program 20 permits the user to identify regions by specifying, for a two-dimensional display, for example, a portion of a two-dimensional plane which is specified with respect to any of the axes, and covering any section of that two-dimensional plane, which may be stored in storage locations of far different addresses in the storage system 12. The debugger program 20 enables the processor 11 to perform the operations set forth in FIGS. 5A through 5E to transform that region identification into addresses for the storage locations containing the required object elements OBJ ELM (i, j, k).

Figure 5A:
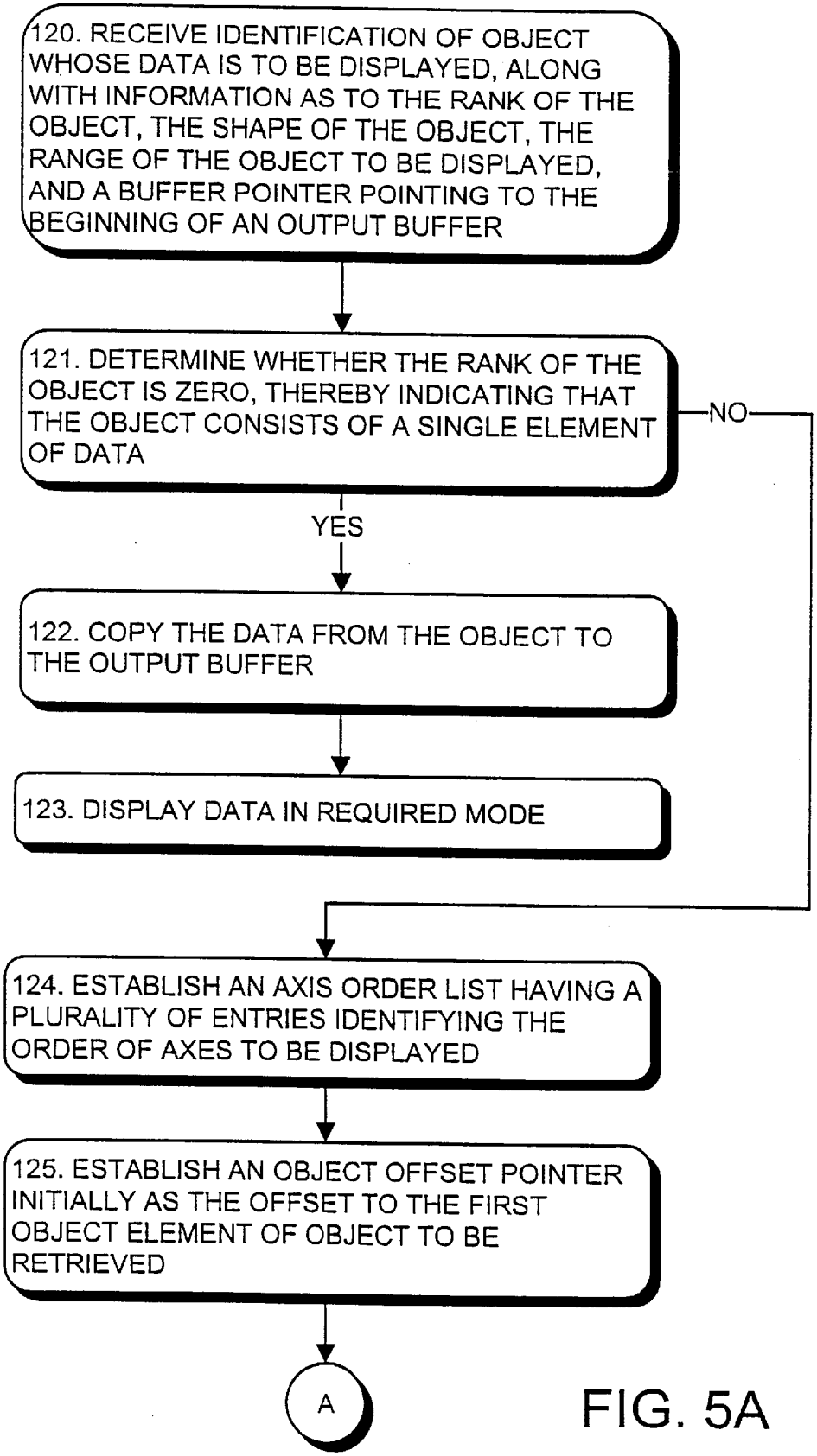
FIGS. 5A through 5E comprises a flow diagram describing the operations of the computer system, under control of the debugger program, in connection with retrieving of object elements of a selected region of the object shown in FIGS. 4A and 4B, from the storage system of the computer system for display.
Figure 5B:
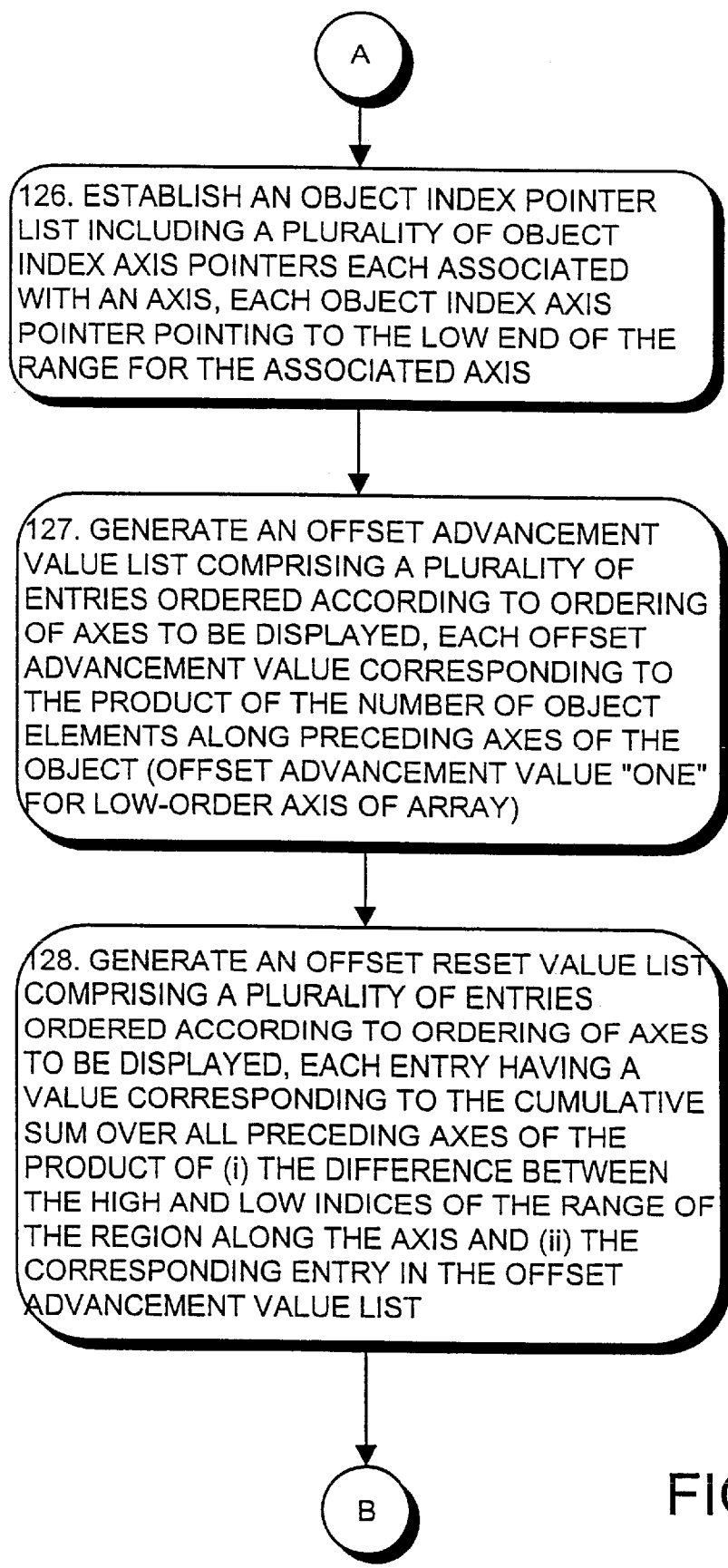
Figure 5C:
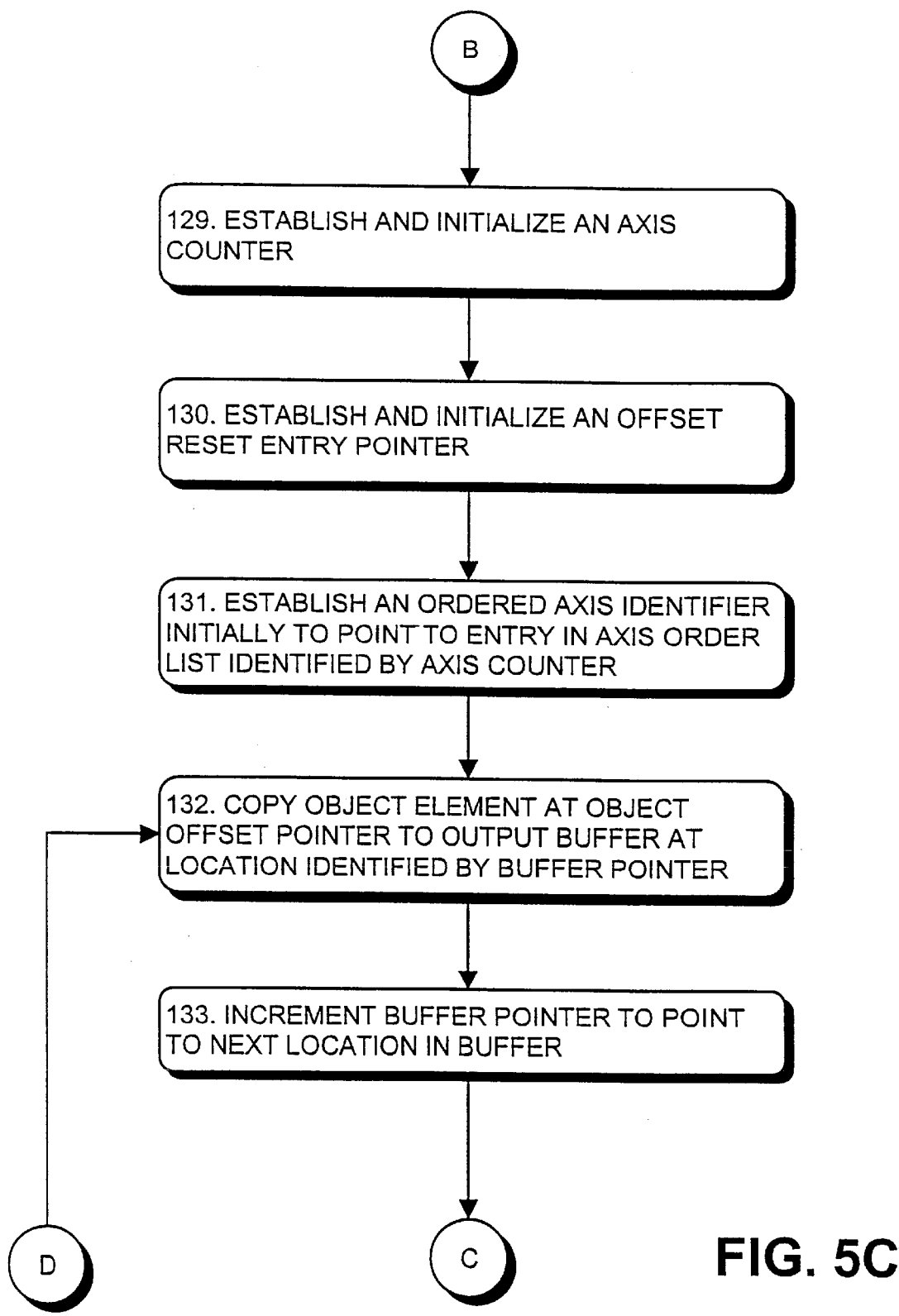
Figure 5D:
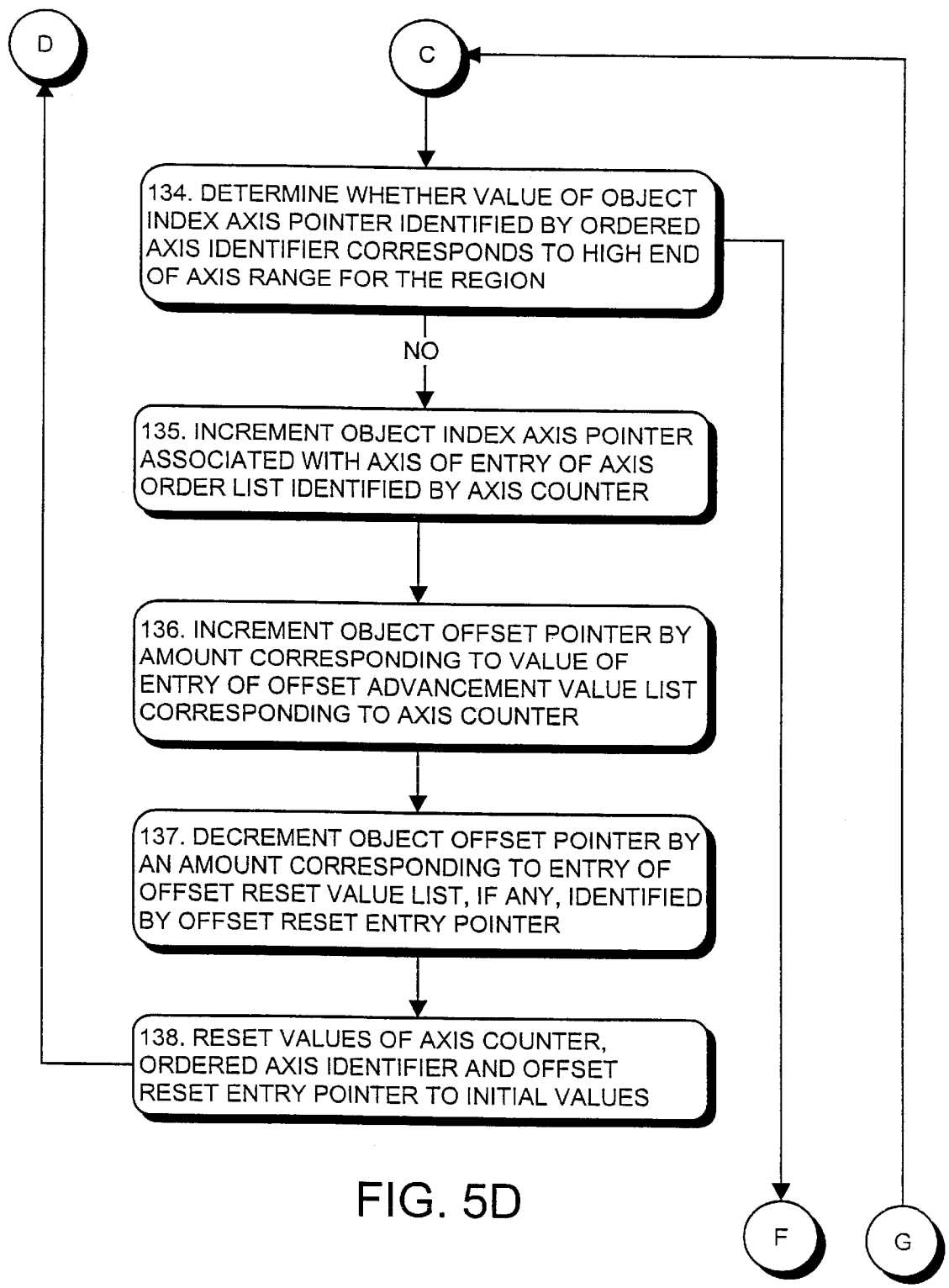
Figure 5E:
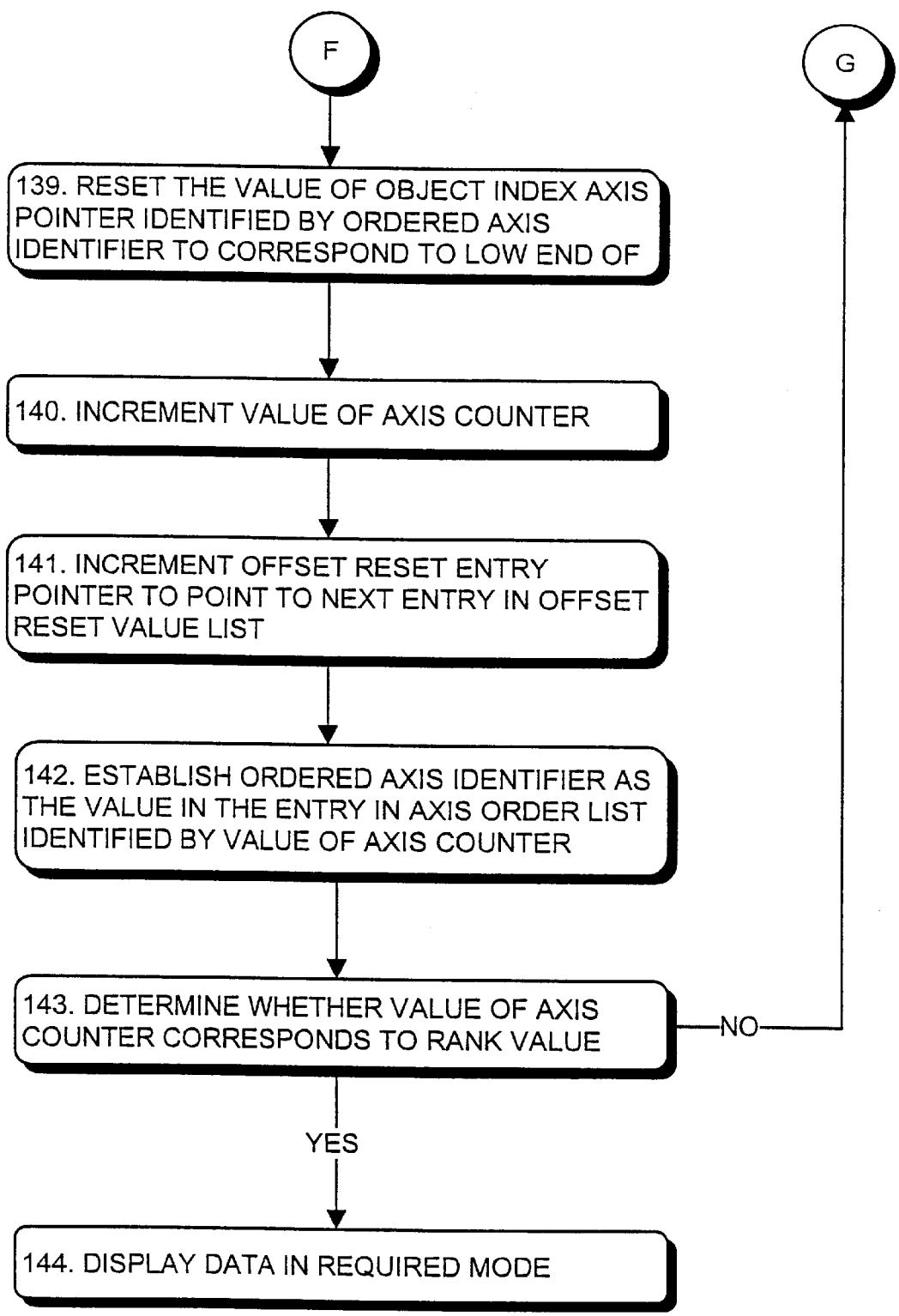

With reference to FIG. 5A, the debugger program 11 first enables the processor 11 to receive a retrieval specification including the identification of the object 21 whose data (that is, whose object elements) is to be displayed, along with information as to the rank of the object, its shape, and the range and ordering of the axes of the selected region whose object elements are to be displayed, as well as a pointer to the beginning of an output buffer in storage system 12 in which the object elements from the region are to be place (step 120). The rank of the object 21 identifies the number of dimensions, which will be zero for a scalar object, and the shape identifies the range of indices along each axis. The shape information includes for each axis both a high index value and a low index value, identifying the high and low ends of the index values for each axis. Both the high and low index values are provided since the range of indices along each axis need not begin with a predetermined value such as zero or one, but instead may begin with any value. Similarly, the selected region will be defined by low and high index values along each axis of the selected region; if, for a particular axis, the selected region is a plane defined by a single index value along that axis, the low and high coordinate values for that axis will be the same. The axis ordering information identifies the order in which the axes are to be traversed in retrieving object elements to be displayed.

The ordering of the axes of the selected region may differ from the ordering of the axes of the object 21; in that case, with reference to, for example, the object shown in FIG. 4A, if the selected region corresponds to a portion of the vertical, side-wise plane according to specified coordinates along axes 2 and 1, for a particular value of axis 3, the processor 11 will enable the display 14 to display the object elements OBJ ELM (i, j, k) depicted in FIG. 4A organized in successive locations in each column, that is, with increasing values of index "i" in the selected region, in successive locations along each row in the display 14. Object elements OBJ ELM (i, j, k) in successive columns, that is, with increasing values of index "j" in the selected region, will be displayed in successive rows. Effectively, the reversal of the ordering of axes 1 and 2 in the specification for the region will cause the processor 11 to enable the display by display 14 of object elements OBJ ELM (i, j, k) in the format OBJ ELM (j,i,k) for the specified plane defined by index "k". Hereinafter "object order" will identify the ordering of the successive axes in the object 21, and "retrieval order" will identify the ordering of the successive axes for the region to be retrieved as identified in the retrieval specification.

After receiving the identifications in step 120, the processor 11 tests the rank value to determine whether the rank of the object 21 is zero, to, in turn, determine whether the object 21 is a scalar object (step 121). If the processor 11 determines that the rank value is zero, it sequences to step 122 to copy the single object element comprising the object to the output buffer, using the pointer that was received in step 120, and enables the display 14 to display the object element in the specified mode.

If, on the other hand, the processor 11 determines in step 121 that the rank value is not zero, which indicates that the object 21 is not a scalar object, it sequences to step 124 to begin a sequence of operations to retrieve object elements from the region of the object identified by the other information received in step 120. Initially, the processor 11 will perform a series of preliminary steps to establish an axis order list (step 124), an object offset pointer (step 125) and an object index pointer list (step 126). The axis order list established in step 124 has a series of entries each identifying one of the axes of the object 21, the series identifying the axes in retrieval order.

The object offset pointer generated during step 125 is an offset, from the address in storage system 12 of the first object element OBJ ELM (1,1,1) in the object 21, to the first object element OBJ ELM (i, j, k) to be retrieved; it will be appreciated that the value of the object offset pointer is the sum, over all axes (in object order), of a value generated for each axis, the value corresponding to (a) the difference between the low value of the axis' index for the region to be retrieved and the low value of the index for the object 21, the difference multiplied by (b) the number of object elements associated with each value of indices for the axis and any higher-ordered axes (in object order). It will be appreciated that the number of object elements in item (b) for each axis corresponds to the multiplicative product of the range of index values along each axis for the object 21, which, in turn, corresponds to the difference between the high-and low-index values from the shape information, plus one.

The object index pointer list, established in step 126, also includes a succession of entries, each entry being associated with an axis. Each entry in the list initially including a value corresponding to the low index value for an axis of the region to be displayed, with the succession of entries identifying the low index values for the succession of axes in object order. The entries of the object index pointer list will be updated during retrieval of the object elements OBJ ELM (i, j, k) and used to determine when, for each axis, the object element being retrieved is at the high end of the range for that axis.

In addition, the processor 11 generates two lists, namely, an offset advancement value list (step 127) and an offset reset value list (step 128), that it will use in updating the object offset pointer as it retrieves the successive object elements OBJ ELM (i, j, k) from the identified region. The offset advancement value list (step 127) includes a plurality of entries, each associated with an axis, with the succession of entries being associated with the succession of axes in retrieval order. The contents of the entries of the offset advancement value list are used in incrementing the offset pointer to point to storage locations for successive object elements OBJ ELM (i, j, k) long each of the axes. The successive entries in the offset advancement value list corresponds to the retrieval order as identified in the retrieval specification information received in step 120. Each entry in the offset advancement value list receives an offset advancement value which corresponds to the multiplicative product of the number of discrete index values for the object elements along each of the preceding axes (in object order) of the object 21. For each axis, it will be appreciated that the value which is used in the multiplication operation is the difference between the high and low index values received in the shape information for object 21, plus "one." Thus, and with reference to object elements OBJ ELM (i, j, k) in FIGS. 4A and 4B, for the low order axis (in object order), by observation if index "i" varies from the low end to the high end of its range for the region whose object elements are being retrieved, but indices "j" and "k" are maintained constant, the successive object elements OBJ ELM (i, j, k) are in successive storage locations, as shown in FIG. 4B. Accordingly, to retrieve successive object elements OBJ ELM (i, j, k) along the low-order axis (in object order) associated with index "i," the processor, after retrieving one object element OBJ ELM (I,j,k) would have to increment the object offset pointer by "one" to point to the next object element OBJ ELM (I+1,j,k).

On the other hand, successive object elements OBJ ELM (i, j, k) along the axis associated with index "j" are located in storage locations five locations apart, as shown in FIG. 4B, which corresponds to the range of index values which object elements OBJ ELM (i, j, k) can have for I the low-order (in object order) axis associated with the index "i" in the object 21, which, in turn, corresponds to the difference between the high and low index values for the axis associated with index "i"(which are five and one, respectively) plus one. Similarly, as the high-order index "j" is incremented, the object elements OBJ ELM (i, j, k) will be located in storage locations thirty locations apart, which corresponds to the number of index values along the axis associated with index "i" in object 21 (which is five), times the number of index values along the axis associated with index "j"(which is six). Offset advancement values for high-order axes, if any, are determined in the same manner. Thus, each entry in the offset advancement value list receives an offset advancement value which corresponds to the multiplicative product, over all preceding axes (in object order) for the object 21, of the difference between the high and low index values for the region being retrieved, plus one.

The offset reset value list (step 128) also includes a plurality of entries, each associated with one of the axes, with the sequence of entries in the offset reset value list also corresponding to retrieval order as identified in the retrieval specification information received in step 120. The values in the entries in the offset reset value list will be used to reduce the value of the object offset pointer, after it has been advanced in accordance with the corresponding entries in the offset advancement value list (generated in step 127) after the object elements OBJ ELM (i, j, k) have been retrieved once for one axis, such as that identified by index "j" equal to "$J_H$" (where index value $J_H$ corresponds to the high end of the range for index "j" in the region being retrieved) by an amount so that the offset pointer will point to the storage location for the first object element OBJ ELM ($I_L$, $J_L$, K+1), where indices "$I_L$" and "$J_L$" correspond to the low ends of the ranges of indices "i" and "j," respectively. It will be appreciated that, after, for example, the object element OBJ ELM ($I_H$,1,1) (where index value $I_H$ corresponds to the high end of the range for index "i" in the region being retrieved) has been retrieved, next object element OBJ ELM($I_L$,2,1) will be retrieved. In that case, since the value of index "j" has been increased, the offset pointer will also increase by an amount corresponding to the value of in the offset advancement value list entry for with the axis associated with index "j." However, that will cause the offset pointer to point to the object element OBJ ELM ($I_H$,2,1) at the high end of the range, instead of the object element OBJ ELM ($I_L$,2,1) at the low end of the range for index "i." In that case, the offset pointer reset value is used to reset the offset point to enable it to point to the object element OBJ ELM (I,2,1) at the low end of the range. In the case of the axis associated with index "i" in this illustration, it will be apparent that the reset value will correspond to the difference between the high and low values of the range of the region being retrieved, multiplied by the offset advancement value.

Similarly, if the value of index "k" is increased, which will occur after retrieval of the object element OBJ ELM ($I_H$,$J_H$,1) (where indices $I_H$ and $J_H$ correspond to the high ends of the ranges associated with indices "i" and "j," respectively), the offset pointer, after being advanced by the offset advancement value associated with the axis associated with index "k" will be reset to point to the first object element OBJ ELM ($I_L$, $J_L$, 2) (where indices $I_L$ and $J_L$ correspond to the low ends of the ranges associated with indices "i" and "j" respectively). In that case, the offset reset value used with index "k" will be the sum of two reset values, namely, an offset reset value generated using the high and low ends of the region along the axis associated with index "j", and an offset reset value generated using the high and low ends of the region along the axis associated with index "i". The offset reset value generated using the high and low index values of the region along the axis associated with index "i" is the same as that described above in connection with incrementation of the index "j", and the offset reset value generated using the high and low index values for the region along the axis associated with index "j" corresponds to the offset advancement value used with that axis, multiplied by the difference between the high and low ends of the region along the axis associated with that index. Accordingly, it will be appreciated that, in general for an axis, the offset reset value will correspond to the sum, over all of the preceding axes (in object order), of the difference between the high and low values of the range of the axis in the region being retrieved, the difference being multiplied by the offset advancement value associated with the axis.

In updating the object offset pointer to be used in retrieving successive object elements from the identified region, the processor will determine the first axis specified in the axis order list, that is, the lowest-ordered axis (in retrieval order) for which the just-retrieved object element OBJ ELM (i, j, k) is not at the high end of the axis' range, and increment the value of the object offset pointer by the value in the entry of the offset advancement value list associated with that axis. In addition, it will decrement the incremented object offset pointer by the value in the entry, if any, of the offset reset value list corresponding to the preceding axis (in retrieval order). Further, the processor 11 will increment the value of the object index axis pointer associated with that axis, and reset the object index axis pointers associated with the preceding axes (in retrieval order) to their low ends for the range being retrieved. The resulting object offset pointer will, as described above, point to the first object element in a sub-region of the region associated with the axis whose value was incremented, that is, the object element of the sub-region for which the values of the indices of the preceding axes are all at the low ends of their respective ranges.

In performing these operations, the processor 11 will make use of three lists, namely, the axis order list, the offset advancement value list and the offset reset value list. The entries of the offset advancement list, as described in connection with step 127, are in retrieval order, and the processor 11 will make use of the entries in the order in which they are located in the list. The entries of the offset reset value list are also generally in retrieval order, but as described above, in incrementing the object offset pointer as the low-order axis, in retrieval order, is traversed, the object reset value list will not be used, and further for each high-order axis (in retrieval order) the entry from the object reset value list generated for the preceding axis (also in retrieval order) will be used. In adjusting the value of the index of the first axis (in retrieval order) for which the index is not at the high end of its range, the processor 11 will use the object index pointer list, whose entries are in axis order, and to identify the particular entry the processor will use the successive entries of the axis order list (established in step 124).

Accordingly, the processor 11 will initially establish an axis counter (step 129), a reset entry pointer (step 130) and an ordered axis identifier (step 131). The processor 11 will use the axis counter (step 129) to maintain a count value as it sequences through the successive axes (in retrieval order) until one is reached whose entry, in the object index pointer list, is not at the high end of the region. It will be appreciated that the axis counter will not itself identify the successive axes in retrieval order, but the successive count value maintained by the axis counter will identify the successive entries in the axis order list which do identify the axes in retrieval order. The processor will use the axis counter to identify the sequence of entries in the axis order list to, in turn, facilitate the identification of the sequence of entries in the object index pointer list for the axes in retrieval order. The reset entry pointer will, as described below, in connection with step 137, initially contain a value that indicates that it does not identify an entry of the offset reset value list, but when subsequently incremented will identify entries of the list.

Following step 131, the processor 11 will copy the object element identified by the object offset pointer to the output buffer at the location identified by the buffer pointer, which was received in the retrieval specification information in step 120 (step 132), and will increment the buffer pointer to point to the next location in the output buffer (step 133). The processor 11 will then proceed to a loop comprising steps 134 and 139 through 143 to identify the first axis (in retrieval order) whose entry in the object index pointer list does not contain a value which is the high end of the range for the region being retrieved. Initially, the processor will determine whether the value of the object index axis pointer that is identified by the ordered axis identifier corresponds to the high end of the range for that axis (step 134). On its first time through step 134, assuming that the low end of the low-order axis (in retrieval order) for the region being retrieved does not coincide with the high end, the processor will sequence to a series of steps 135 through 138. In that sequence, the processor 11 will increment the object index axis pointer associated with the axis identified by the entry of the axis order list that is identified, in turn, by the axis counter (step 135). In addition, the processor will update the value of the object offset pointer by an amount corresponding to the value of the entry of the offset advancement value list corresponding to the value of the axis counter (step 136), which in this case is the first entry in the offset advancement value list, and will determine whether there is an entry in the offset reset value list corresponding to the value of the reset entry pointer. As noted above, for adjustment of the object offset pointer along the low-order axis (in retrieval order), the reset entry pointer was initialized (step 130) so as to represent a value indicating that it does not identify an entry in the offset reset value list and so the processor 11 will sequence past step 137. The processor 11 will then reset the values of the axis counter, the ordered axis identifier and the reset entry pointer to their initial value (step 138) and return to step 132 to retrieve the next object element as identified by the updated object offset pointer.

The processor 11 will repeat operations described above in connection with steps 132 through 139 until it determines, in step 134, that the value of the object index axis pointer for the low-order axis (in retrieval order) corresponds to the high end of the range for the region being retrieved. At that point, processor 11 will sequence to step 139. In that step, processor 11 will reset the value of the object index axis pointer identified by the ordered axis identifier, that is, the low-order axis (in retrieval order) to the value corresponding to the low end of the range for the region being retrieved. The processor 11 will then increment the value of the axis counter (step 140) and the offset reset entry pointer (step 141). At this point, the offset reset entry pointer will point to the first entry in the offset reset value list, which contains the reset value determined in step 128 for the low-order axis (in retrieval order). The processor 11 also establishes the ordered axis identifier to point to the entry in the axis order list identified by the value of the axis counter, that is the entry identifying the second-low-order axis (in retrieval order) (step 142). The processor 11 also determines whether the value of the axis counter corresponds to the rank value (step 143), which was received in the retrieval specification information in step 120. Unless the object 21 is a one-dimensional object, the processor 11 will have a negative determination in step 143, and will return to step 134.

In step 134, the processor 11 will again determine whether the value of the object index axis pointer that is identified by the ordered axis identifier corresponds to the high end of the axis range for the region being retrieved. At this point, the ordered axis identifier will identify the second-low-order axis, and so the processor 11 will determine at this point whether the value of object index axis pointer for the second-low-order axis (in retrieval order) corresponds to the high end for that axis. If not, the processor 11 will sequence to step 135 to increment the object index axis pointer associated with that axis, that is, the second-low-order axis (in retrieval order). In addition, the processor 11 will increment the object offset pointer by an amount corresponding to the value of the entry in the offset advancement value list corresponding to the axis counter, that is, the advancement value generated in step 127 for the second-low-order axis (step 136), and will decrement the result by an amount corresponding to the value in the entry of the offset reset value list identified by the offset reset entry pointer (step 137), which is the offset reset value generated in step 128 for the low-order axis (in retrieval order).

The processor 11 will then reset the values of the axis counter, the ordered axis identifier and the offset reset entry pointer to the initial values established in steps 129 through 131, respectively, and return to step 132 to copy the object element pointed to by the object offset pointer to the output buffer at the location identified by the buffer pointer, and will increment the buffer pointer to point to the next location in the output buffer into which it will copy the next object element, if any.

Thereafter, the processor 11 will return to step 134. At this point, the ordered axis identifier again identifies the low-order axis (in retrieval order), and so the processor 11 will determine whether the value of the object index axis pointer for that axis corresponds to the high end for the axis for the region being retrieved. It will be recalled that the value of the object index axis pointer for that low-order axis (in retrieval order) was reset to the low end of the range during step 139 of the preceding sequence. Accordingly, the processor 11 will make a negative determination in step 134 and step to the sequence comprising steps 135 through 138 and perform the operations described above, namely, incrementing the object index axis pointer associated with the low-order axis (in retrieval order) (step 136), incrementing the object offset pointer by the value of the entry of the offset advancement value list corresponding to the low-order axis (in retrieval order) (step 136) and resetting the values of the axis counter, the ordered axis identifier and the offset reset entry pointer to their respective initial values (step 138), and thereafter it will return to step 132. The processor 11 will repeat the operations described above in connection with steps 132 through 138 until it again determines in step 134 that the value of the object index axis pointer for the low-order axis (in retrieval order) again corresponds to the high end of the range for that axis, at which point it will again step to the sequence of step 139 through 143, and perform the operations described above in connection with those steps.

At this point, the processor 11 will again reset the value of the object index axis pointer associated with the low-order axis (in retrieval order) (step 139), increment the value of the axis counter (step 140) and will increment the offset reset entry pointer (step 141), which at this point will again point to the first entry in the offset reset value list. In addition, the processor 11 will update the ordered axis identifier as the axis identified by the entry in the axis order list that is, in turn, identified by the value of the axis counter (step 142). At this point, the ordered axis identifier will again identify the-second-low-order axis (in retrieval order). If the processor 11 again determines in step 143 that value of the axis counter does not correspond to the rank value, it will return to step 134 and repeat the operations described above in connection with steps 134 through 138, 132 and 133, again determining in step 134 whether value of the object index axis pointer for the second-low-order axis (in retrieval order) corresponds to the high end of the range of the region for that axis.

At some point, it will be appreciated that, in performing step 134 in connection with the object index axis pointer for the second-low-order axis (in retrieval order), the processor 11 will determine that that object index axis pointer does correspond to the high end of the range of the region for that axis. In that case, it will again sequence to step 139, reset the value of the pointer associated with that axis to the low end of its range, and perform the operations in connection with steps 140 through 143 as described above. In this case, the axis counter will be incremented so as to point to the third entry in the axis order list, the offset reset entry pointer will point to the second entry in the offset reset value list, and the ordered axis identifier will identify the contents of the third entry in the axis order list, namely, the third-low-order axis (in retrieval order). If the processor 11 again determines that the value of the axis counter does not correspond to the rank value, it will again return to step 134, to determine whether the value of the object index axis pointer for the third-low-order axis (in retrieval order) corresponds to the high end of the range for that axis for the region being retrieved. If at this point the processor makes a negative determination in step 134, it will increment the value of the object index axis pointer associated with the third-low-order axis (in retrieval order) (step 135), update the object offset pointer using the entry of the offset advancement value list identified by the axis counter [that is, the entry generated in step 127 for the third-low-order axis (in retrieval order)] (step 136) and the entry of the offset reset value list identified by the offset reset entry pointer [that is, the entry generated in step 128 for the second-low-order axis (in retrieval order)] (step 137), and reset the values of the axis counter, the ordered axis identifier and offset reset entry pointer in step 138 before returning to step 132 to continue performing the operations as described above. It will be appreciated that the object index axis pointer for both the low-order axis and the second-low-order axis (both in retrieval order) are now at the low ends of their respective ranges, and so the processor 11 will repeat the operations in connection with the full range of object index axis pointer values, that is, the full range of indices for these axes, as described above. The processor 11 will progress in a similar manner through successively-higher-ordered axes (in retrieval order) in connection with steps 134 and 139 through 143, and when it does sequence to a higher-ordered axis it will reset the object index axis pointers for all lower-ordered axes (in retrieval order) to the low ends of their respective ranges.

The processor 11 will continue to perform operations as described above through successive axes, until at some point it determines in step 143 that the value of the axis counter corresponds to the rank value. At that point, it will exit and display the retrieved object elements in the output buffer in the required display mode (step 144).

Figure 6A:
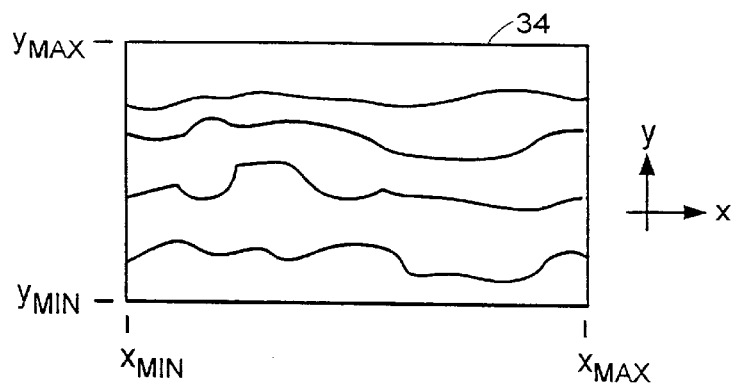
FIGS. 6A through 6E depict various display images, and are useful in connection with descriptions of regions to be retrieved in response to particular conditions.
Figure 6B:
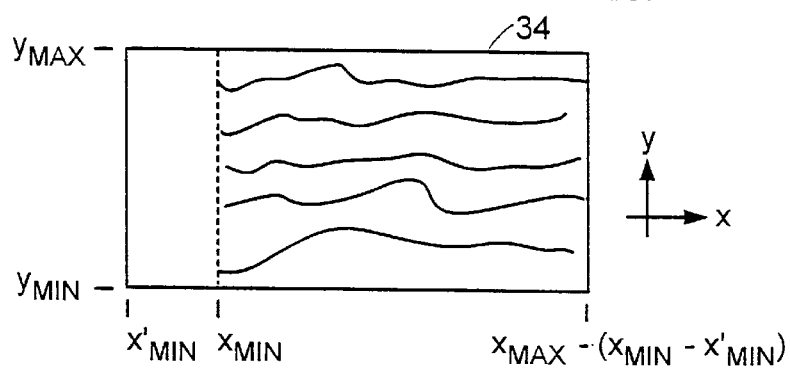

As described above, generally the high and low index values of the axes defining the region to be displayed will be explicitly provided by the user through use of the sliders noted above in connection with FIGS. 3A through 3E. Depending on some manipulations in connection with the sliders depicted in those FIGS. (step 104, FIG. 2), resulting in a change in the region of the object 21 whose elements are being displayed and necessitating a further retrieval of object elements (step 103, FIG. 2), it may not be necessary to perform a retrieval of all object elements from the new region, but instead only a portion of the object elements. This will be described in connection with FIGS. 6A through 6D. These figures show a window 34 in display 14 which is displaying object elements in graphic form. Display axes X and Y have been assigned to the window 34, with axis X referencing the horizontal direction and axis Y referencing the vertical. The axes X and Y will correspond to selected ones of the axes in the object 21. Shown at the extreme lower left and right in FIG. 6A are coordinates $X_{min}$, and $X_{max}$ respectively, which will correspond generally to the low and high index values of the axis of object 21 corresponding to display axis X in the retrieved region. Similarly, shown at the extreme lower left and upper left in FIG. 6A are coordinates $Y_{min}$ and $Y_{max}$ respectively, which will correspond generally to the low and high index values of the axis of object 21 corresponding to display axis Y in the retrieved region.

Figure 6C:
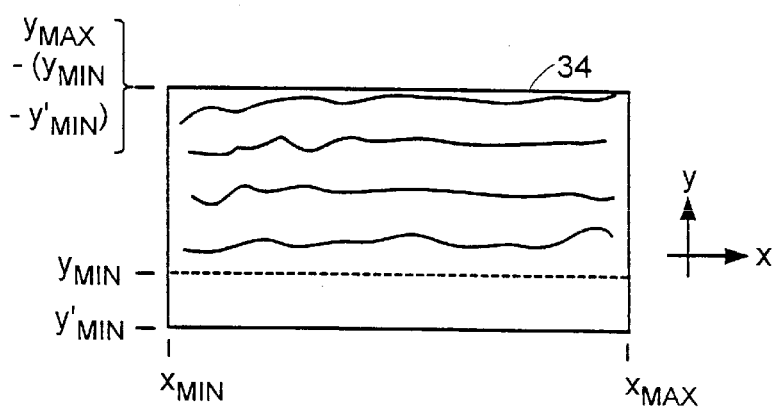

If, after the retrieved region is displayed as shown in FIG. 6A, the user manipulates the sliders to effect a horizontal pan of the displayed region (step 104, FIG. 2), if the new region to be displayed includes some portion of the old region, the processor will not have to retrieve the portion from the old region. This will be described in connection with FIG. 6B, which depicts the window 34 after the user has manipulated the sliders to pan the image in the window to the left, in which case the image will appear to shift to the right, along the display axis X, by a distance $(X_{min\text{-}Xmax}')$ In that case, the object elements contributing to the portion of the image between index values $X_{min}$ and $[X_{max}\text{-}(X_{min}\text{-}X_{min}')]$, along the X display axis, and index values $Y_{min}$ and $Y_{max}$ along the Y display axis, will the same as in the original image, and so the processor 11 will only need to perform a retrieval operation in connection with the region of object 21 bounded by the index values and $X_{min}$ and $X_{min}$ ', along the axis of object 21 associated with display axis X, and index values $Y_{min}$ and $Y_{max}$ along the axis of object 21 associated with display axis Y. Similarly, if the user pans in the vertical direction, as shown in FIG. 6C, the processor will only need to perform a retrieval operation in connection with the region of object 21 bounded by index values $Y_{min}$ and $Y_{min}'$, along the axis of object 21 associated with display axis Y, and index values $X_{min}$ and $X_{max}$, along the axis of object 21 associated with display axis X.

Figure 6D:
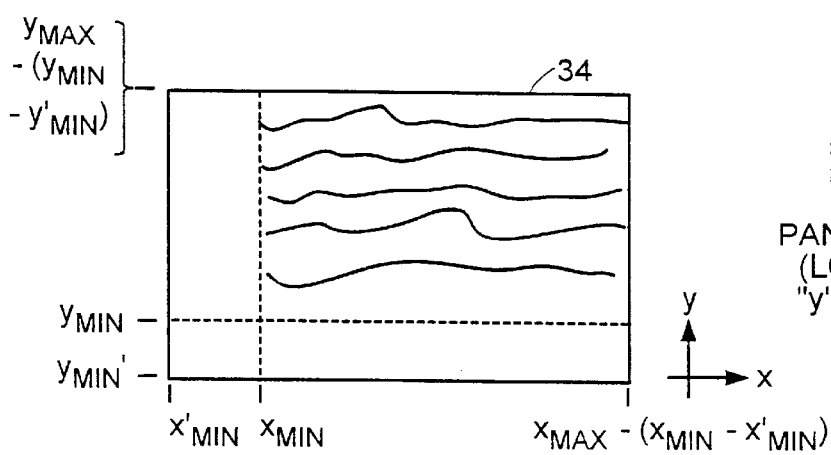

If a user pans diagonally, which is shown in FIG. 6D, the operations performed by the processor 11 are somewhat more complicated. The diagonal panning operation is effectively resolved into two panning operations along the horizontal and vertical display axes X and Y, and so the processor 11 will perform two retrieval operations as described above in connection with FIGS. 6B and 6C, except that it will be appreciated that the processor 11 need only retrieve the object elements corresponding to the region defined by index values $X_{min}$ and $X_{min}'$, along the axis of object 21 corresponding to the X display axis, and index values $Y_{min}$ and $Y_{min}'$, along the axis of object 21 corresponding to the Y display axis.

Figure 6E:
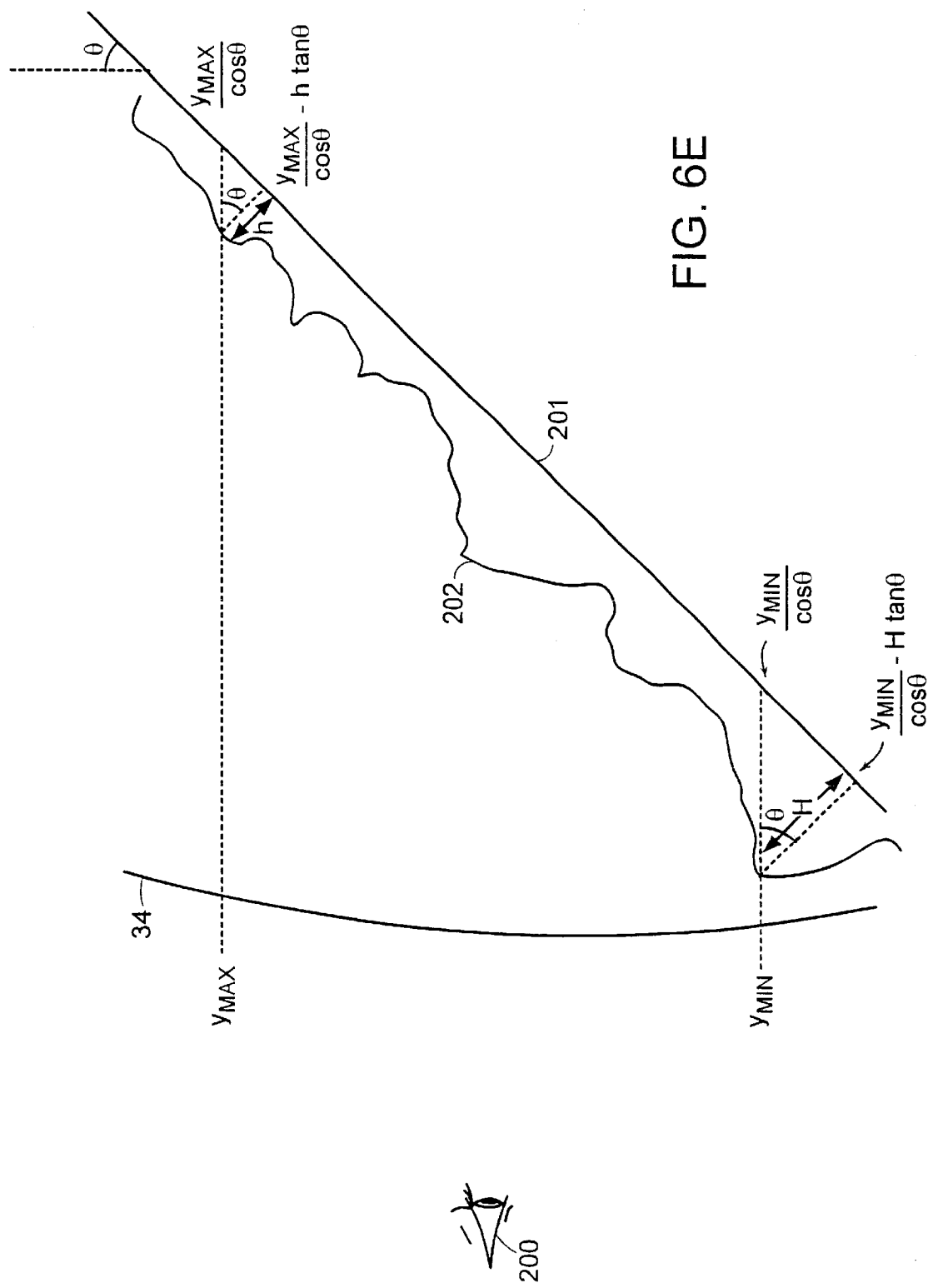

As a further complication, in some graphics display modes, for example the mode described in connection with FIG. 3E in which the retrieved object elements are depicted as a surface as displayed at an angle "θ" to the window 34, the processor 11 may retrieve a somewhat different region than that specified by the user. The arrangement for determining the region to be displayed will be described in connection with FIG. 6E. With reference to FIG. 6E, the Fig. depicts the window 34 when viewed from the left (as shown, for example, in FIGS. 6A through 6D) along the X display axis. The user, represented by viewer 200, would view the window 34 from the left, as shown in FIG. 6E. The axis of the object 21 defining one axis of the region to be displayed is represented by diagonal line 201, the other axis of object 21 associated with the region to be displayed corresponds to the X display axis, which is orthogonal to the Fig. Effectively, FIG. 6E represents a cross-section along a line orthogonal to the X display axis, with line 201 representing one axis of a plane and the X display axis representing the other axis of the plane, and in that case a line 202 represents the contour of the surface defined by the values of the object elements from the region of the object 21. The values of each object element effectively identifies a height value for the contour above the plane represented by line 201 and the X display axis. The height of the contour is actually limited to a maximum height H by either truncation or scaling.

In a display mode as depicted in FIG. 6E, the region retrieved by processor 11 will not correspond to that for which the high and low index values correspond to $X_{max}$ and $X_{min}$, for the axis of object 21 corresponding to the X display axis, and $Y_{max}$ and $Y_{min}$, for the axis of object 21 corresponding to the Y display axis. As shown in FIG. 6E, if the display angle, with respect to the Y display axis, is "θ", the high index value for the region for the axis corresponding to the Y display axis will be at most $Y_{max}$ divided by the cosine of angle "θ". It will be appreciated that, depending on the height of the contour of surface at index values below this, the surface for such index values may obscure any surface contributed by the object elements at the high index value for the region. As shown, for example, in FIG. 6E, if an object element has a value "h" at the index value $(Y_{max}/\cos θ)$-h tan θ (where "cos" represents the cosine function and "tan" represents the tangent function) the resulting surface will obscure any contribution to the surface at higher index values along the axis of object 21 corresponding to the Y display axis. However, retrieving object elements in the region up to this high index value will guarantee that object elements for the entire surface will be retrieved. Similarly, if the processor 11 extends the low index value for the region to a point $(Y_{min}/\cos θ)$-H tan θ, it will be assured of retrieving object elements which may contribute to the surface to be displayed at the low end of the window 34. If the plane for the surface is also angled with respect to the X display axis, the processor 11 will perform similar operations to determine the high and low index values for the region along the axis of the object associated with the X display axis.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A data visualization system for displaying a selected region of a multi-dimensional data object, the data object comprising a plurality of data elements organized in a hierarchy of dimensions, each dimension being associated with an axis, each data element having a position in the data object defined by an index value for each dimension, the data visualization system comprising:

A. a data object store configured to store the data object;

B. an interface configured to receive region identification information identifying the selected region, the region identification information including index range values along each identified axis which define the region of the data object to be displayed, the region identification information being updatable;

C. an object region retrieval element configured to use the region identification information to retrieve data elements from said data store corresponding to the region defined by the axis identifier information and index range values received by the interface, the object region retrieval element being further configured to determine whether updated region identification information identifies a region that overlaps with previously-received region identification information and, if so, retrieve only data elements in the non-overlapping region; and D. a display configured to display the data elements as retrieved by the object region retrieval element, the display being further configured to, if it receives only data elements in the non-overlapping region, display the data elements along with at least a portion of the previously-received data elements.

2. A data visualization system as defined in claim 1 in which, if the updated region identification information identifies a region that overlaps with previously-received region identification information, the region identified by the previously-received region identification information and the non-overlapping region share a common edge, the display being configured to display the data elements in the non-overlapping region along the edge common with the data elements in the region identified by the previously-received region identification information.

3. A data visualization system as defined in claim 2 in which

A. the region identified by the previously-received region identification information and the region identified by the updated region identification information are both two-dimensional regions along two of said axes of said data object, the two axes being identified in the respective region identification information and referred to as display axes, B. said display is a two-dimensional display, each dimension being associated with one of the display axes, and C. if the region identified by said updated region identification information identifies a region that overlaps with the region defined by the previously-received region identification information, said display is configured to, after receiving data elements in said non-overlapping region, adjust the display of the data elements to accommodate the data elements in said non-overlapping region.

4. A data visualization system as defined in claim 3 in which said common edge is along one of said display axes, the display being configured to adjust the display of the data elements by shifting the data elements in the region identified by the previously-received region identification information along the other of said display axes to accommodate the data elements from said overlapping region.

5. A data visualization system as defined in claim 4 in which said display can accommodate a predetermined maximum number of data elements along said other of said two display axes, the display being configured to terminate display of data elements beyond the predetermined maximum number as the data elements are shifted.

6. A data visualization system as defined in claim 1 in which said interface is further configured to receive a display mode identification, the display being further configured to display the data elements in one of a plurality of display modes as identified by the display mode identification as received by the interface.

7. A data visualization system as defined in claim 6 in which the interface is further configured to receive a display angle value and one of said display modes is a graphical display mode in which the data elements are displayed as a surface, the display being configured to display said surface at an angle related to said display angle value.

* * * * *